US008726022B2

(12) United States Patent
Tie et al.

(10) Patent No.: US 8,726,022 B2
(45) Date of Patent: May 13, 2014

(54) METHOD FOR THE ACCESS OF THE MOBILE TERMINAL TO THE WLAN AND FOR THE DATA COMMUNICATION VIA THE WIRELESS LINK SECURELY

(75) Inventors: Manxia Tie, Xi'an (CN); Houjian Tang, Xi'an (CN); Bianling Zhang, Xi'an (CN); Ning Zhang, Xi'an (CN); Xumao Ye, Xi'an (CN)

(73) Assignee: China IWNCOMM Co., Ltd, Xi'an (CN)

(*) Notice: Subject to any disclaimer, the term of this patent is extended or adjusted under 35 U.S.C. 154(b) by 1651 days.

(21) Appl. No.: 10/534,067

(22) PCT Filed: Aug. 5, 2003

(86) PCT No.: PCT/CN03/00632
§ 371 (c)(1),
(2), (4) Date: Jan. 17, 2006

(87) PCT Pub. No.: WO2004/043006
PCT Pub. Date: May 21, 2004

(65) Prior Publication Data
US 2006/0143458 A1      Jun. 29, 2006

(30) Foreign Application Priority Data

Nov. 6, 2002 (CN) .................................. 02 1 39508

(51) Int. Cl.
*H04L 29/06* (2006.01)
(52) U.S. Cl.
USPC ............ 713/169; 713/156; 713/170; 713/173
(58) Field of Classification Search
None
See application file for complete search history.

(56) References Cited

U.S. PATENT DOCUMENTS 5,371,794 A    12/1994  Diffie et al.
5,515,439 A *  5/1996   Bantz et al. ................... 713/156
(Continued)

FOREIGN PATENT DOCUMENTS

CN    1249587 A    4/2000
CN    1298620 A    6/2001
(Continued)

OTHER PUBLICATIONS

Brutch, Tasneem G.; Brutch, Paul C. Mutual Authentication, Confidentiality, and Key Management (Mackman) System for Mobile Computing and Wireless Communication. Proceedings for 14th Annual Computer Security Applications Conference. Pub. Date: 1998. Relevant pp. 308-317. Found at: http://ieeexplore.ieee.org/stamp/stamp.jsp?tp=&arnumber=738651.*

(Continued)

*Primary Examiner* — Cordelia Zecher
*Assistant Examiner* — Jeremiah Avery
(74) *Attorney, Agent, or Firm* — Dickstein Shapiro LLP

(57) ABSTRACT

The present invention relates to a method for the secure access of mobile terminal to the Wireless Local Area Network (WLAN) and for secure data communication via wireless link, which, combining the common key encryption technology and the symmetry encryption technology, has resolved the failure in WLAN to provide effective control on secure MT access, and overcome the limitation on the confidentiality of the data communication via wireless link. When MT logs on AP, both parts must perform the certificate authentication through AS. Only the MT holding the legitimate certificate can access to AP holing the legitimate certificate; MT and AP perform the negotiation of common key for conversation, complete the dynamic revision of the secret key in each authentication, each secret key and in the process of conversation to achieve confidential data communication. Anyway, the method has not only achieved control on the access of MT, but also ensured the security of MT access and high confidentiality of communication.

22 Claims, 2 Drawing Sheets

(56) References Cited

U.S. PATENT DOCUMENTS

| | | | |
|---|---|---|---|
| 6,229,806 B1 | 5/2001 | Lockhart et al. | |
| 6,463,534 B1* | 10/2002 | Geiger et al. | 713/168 |
| 6,772,331 B1* | 8/2004 | Hind et al. | 713/151 |
| 6,823,454 B1* | 11/2004 | Hind et al. | 713/168 |
| 6,886,095 B1* | 4/2005 | Hind et al. | 713/168 |
| 6,912,657 B2* | 6/2005 | Gehrmann | 713/171 |
| 6,971,005 B1* | 11/2005 | Henry et al. | 713/155 |
| 6,976,164 B1* | 12/2005 | King et al. | 713/156 |
| 7,028,186 B1* | 4/2006 | Stenman et al. | 713/173 |
| 7,047,405 B2* | 5/2006 | Mauro | 713/166 |
| 7,058,798 B1* | 6/2006 | Elley et al. | 713/156 |
| 7,107,620 B2* | 9/2006 | Haverinen et al. | 726/29 |
| 7,174,021 B2* | 2/2007 | Krishnaswamy et al. | 380/277 |
| 7,181,530 B1* | 2/2007 | Halasz et al. | 709/238 |
| 7,213,262 B1* | 5/2007 | Elley et al. | 726/10 |
| 7,246,236 B2* | 7/2007 | Stirbu | 713/168 |
| 7,257,836 B1* | 8/2007 | Moore et al. | 726/5 |
| 7,350,076 B1* | 3/2008 | Young et al. | 713/169 |
| 7,389,412 B2* | 6/2008 | Sharma et al. | 713/153 |
| 2004/0103283 A1* | 5/2004 | Hornak | 713/175 |

FOREIGN PATENT DOCUMENTS

| | | | |
|---|---|---|---|
| CN | 1316147 | A | 10/2001 |
| CN | 1351789 | A | 5/2002 |
| EP | 1 098 489 | A2 | 5/2001 |
| EP | 1 178 644 | A2 | 2/2002 |
| JP | 2000-315997 | A | 11/2000 |
| JP | 2001-285956 | | 10/2001 |
| JP | 2001-313979 | A | 11/2001 |
| JP | 2002-026899 | A | 1/2002 |
| JP | 2002-290480 | A | 10/2002 |
| JP | 2003-218954 | A | 7/2003 |
| JP | 2003-249944 | A | 9/2003 |
| WO | WO 02/09345 | A1 | 1/2002 |

OTHER PUBLICATIONS

International Search Report dated Oct. 23, 2003.

Marco Casole; "WLAN security—Status, Problems and Perspective"; EW2002 (European Wireless 2002), Online, Feb. 28, 2002, Florence, Italy; retrieved from the Internet: URL: http://www2.ing.unipi.it/ew2002/>.

Young Kim; "Security Solution in Ericsson Wireless LAN Systems"; Ericsson, May 2001; XP002263321, paragraph 4.

Alper E. Yegin et al.; "Secure Network Access Using Router Discovery and AAA"; UNAP Working Group, Internet Draft, Category: Standards Track; NTT Multimedia Labs, Nov. 2001.

\* cited by examiner

METHOD FOR THE ACCESS OF THE MOBILE TERMINAL TO THE WLAN AND FOR THE DATA COMMUNICATION VIA THE WIRELESS LINK SECURELY

FIELD OF THE INVENTION

The present invention relates to a method for the secure access of mobile terminal to the Wireless Local Area Network (WLAN) and for secure data communication via wireless link, a product of combining wireless communication technology with encryption technology.

BACKGROUND TECHNOLOGY

The object of personal communication is to enable one to carry on any communication at any time, at any place, and with any other person, and to freely enjoy the multiple services provided on networks. Incorporating the two popular technologies, such as the IP technology and wireless communication technology, the WLAN technology follows the trend of broadband development and provides mobile mainframe or mobile terminal with convenient and high-speed internet access services to meet the increasing demands for the high-speed network and multimedia communication services. The WLAN not only supports mobile computation, but also has the flexibility, expeditiousness and expandability of a framework. FIG. 1 is a diagram showing the structure of the WLAN-based broadband wireless access network mainly comprising devices, such as the mobile terminal (MT), access point (AP), and wireless access server (WAS), wherein MT remains freely mobile, AP performs the functions of cell managements, including hand off between the cells, MT management and bridging, and WAS performs the MT internetwork roaming management. From fixed access to mobile wireless access to the internet, the WLAN-based broadband wireless IP technology has brought brand-new concept to, and had tremendous impact on, the worldwide network environment. The system, which is of extraordinarily wide application, is very useful in commercial networks (mainly corporate intranet), institutional users' networks (e.g. public security, finance, and government departments), area networks (e.g. schools, hospitals, repartntial quarters, remote monitor or concentrated monitor), temporary networks (e.g. temporary meetings), outdoor mobile subscribers and places where it is difficult to lay wires and where constant change is involved.

As for WLAN, the issue of its security is a matter by far more serious than the wired networks. For that matter, several levels of means are incorporated in WLAN to address the issue. First providing a different Service Set ID (SSID) for each AP and forcing MT to present corresponding SSID at the time of access to allow users of different groups to access and distinctively restrict the right to access the resources. However, making use of the SSID is one of the most ocular ways of authentication and the relatively low level of security authentication since anyone who knows the SSID can access a network. Second is the address restriction, that is, preventing unauthorized access by placing at AP the Medium Access Control (MAC) address table of the authorized MT wireless card. However, the MAC address of the wireless card is not difficult to obtain and possible to be forged. Therefore, it is also a relatively low-level authentication for authorization. Anyway, neither of the two ways can effectively control the access of MT, and it is all the more impossible to ensure the confidentiality of communication.

Besides the above two methods, a measure more widely used now is introduction, on the basis of the International Standard (IEEE802.11) of WLAN, into WLAN of the RC-4-based Wired Equivalent Privacy (WEP) confidentiality mechanism for data encryption and transmission. The WEP algorithm uses the single key system, i.e. using the same secret key for encryption/decryption, and the secret key is 64 or 128 bits in length, in which 40 or 104 bit is the fixed part known as initiation secret key, namely the one arranged at AP and MT, and the remaining 24 bit is a variable part known as the initiation vector, which is to be changed by the driver software of the network card in the process of communication. That is to say, the key for encryption is variable, which ensures, to a certain extent, the confidentiality of the wireless communication. However, due to the regularity of the variation of the initiation vector, the WEP algorithm is not quite secure. This was first discovered by a research team of the University of California, the U.S. in March 2001. They pointed out that the WLAN of WEP algorithm can be broken through within 5 hours for this reason: assume that the initiation vector value changes at the rate of addition of 1 per frame, each frame is 1500 bytes long, and the rate of data transmission is 11 megabit, then the initiation vector repeats at the period of $$1500 \text{ byte/frame} \times 8 \text{ bit/byte} \times 1 \text{ second}/(11 \times 10^6 \text{ bit}) \times 2^{24} \text{ frame} \approx 18300 \text{ seconds} \approx 5 \text{ hours},$$

i.e. two-frame text encrypted by the same secret key is obtained at the interval of 5 hours, and it is thus possible to guess or calculate the value of the initiation secret key. It must be pointed out here that the length of the secret key does not affect its decryption time, but complicates the guess and calculation. In August 2001, three world top decryption experts, two experts with the Weizmann Research Institute, Israel and a researcher with the Cisco (思科) Incorporation, performed a WEP security test. They decrypted within an hour the secret key used for WLAN according to a small part of data taken from the network. Also, the AT&T Laboratory has accomplished the decryption in the same way. This sufficiently shows that the WEP cannot ensure the security of WLAN. The matter of security has become one of the obstacles blocking the wide application of WLAN, and secure access and confidential communication have been the most important part in the research of the WLAN technology.

SUMMARY OF THE INVENTION

The object of the present invention is to overcome the abovementioned technical deficiencies and to provide a method for the secure access of mobile terminal to the Wireless Local Area Network (WLAN) and for secure data communication via wireless link. It combines the common key encryption technology and the symmetry encryption technology, resolves the failure of the WLAN to provide effective control on secure MT access, and overcomes the limited confidentiality of the data communication via wireless link, so that it has not only achieved control on the access of MT, but also ensured the security of MT access and high confidentiality of communication.

The present invention provides a method for the secure access of mobile terminal to the Wireless Local Area Network (WLAN) and for secure data communication via wireless link, wherein MT and AP perform the two-way certificate authentication through the authentication server (AS); and MT and AP perform negotiation of secret key for conversation.

According to its preferred embodiments, the present invention has provided a method for the secure access of mobile terminal to the Wireless Local Area Network (WLAN) and for secure data communication via wireless link, wherein when MT logs on AP, MT and AP performs said two-way certificate authentication through AS; after said two-way certificate authentication is successfully performed, MT and AP perform said negotiation of the secret key for conversation.

According to its preferred embodiments, the present invention has provided a method for the secure access of mobile terminal to the Wireless Local Area Network (WLAN) and for secure data communication via wireless link, wherein when MT logs on AP, MT and AP inform one another of their respective certificate, and then they perform negotiation of secret key for conversation, and after said negotiation of secret key for conversation is performed, MT and AT performs the two-way certificate authentication through AS, and judge whether the certificate used by the other part is the same as the one informed by it. If it is not, the authentication fails; if it is, the result of the authentication depends on the result of said two-way certificate identification.

Said two-way certificate identification comprises:
1) when MT logs on AP, MT sends to AP the access authentication request message containing the MT certificate;
2) after AP receives said access authentication request message, it adds the AP certificate to the message, then sends to AS the certificate authentication request message containing said MT certificate and AP certificate;
3) after AS receives said certificate authentication request message, AS authenticates the AP certificate and MT certificate in said message, and then sends back to AP the certificate authentication response message with the AS signature;
4) after AP receives said certificate authentication response message, AP authenticates the AS signature, so as to obtain the result of authentication of the MT certificate, and then sends back to MT the certificate authentication response message as the access authentication response message; and
5) after MT receives: said access authentication response message, MT authenticates the AS signature and obtains the result of authentication of the AP certificate, so as to complete said two-way certificate identification between MT and AP.

According to its preferred embodiments, the present invention has provided a method for the secure access of mobile terminal to the Wireless Local Area Network (WLAN) and for secure data communication via wireless link, wherein 1) when MT logs on AP, MT sends to AP the access authentication request message containing the MT certificate for said two-way certificate authentication; 2) after AP receives said access authentication request message, it adds the AP certificate to the message, then sends to AS the certificate authentication request message containing said MT certificate and AP certificate for said two-way certificate authentication, and meanwhile begins with MT negotiation of the secret key for conversation; 3) after AS receives said certificate authentication request message, AS authenticates the AP certificate and MT certificate in said message, and then sends back to AP the certificate authentication response message with AS signature for said two-way certificate authentication; 4) after AP receives said certificate authentication response message, AP authenticates the AS signature, so as to obtain the result of authentication of the MT certificate, and then bends back to MT the certificate authentication response message as the access authentication response message for said two-way certificate authentication; and 5) after MT receives said access authentication response message, MT authenticates the AS signature and obtains the result of authentication of the AP certificate, so as to complete the process of said two-way certificate identification between MT and AP, and then MT performs the corresponding processing to complete said negotiation of secret key for conversation.

According to its preferred embodiments, the present invention has provided a method for the secure access of mobile terminal to the Wireless Local Area Network (WLAN) and for secure data communication via wireless link, wherein 1) when MT logs on AP, MT sends AP the access authentication request message containing the MT certificate for said two-way certificate authentication; 2) after AP receives said access authentication request message, it adds the AP certificate to the message, then sends to AS the certificate authentication request message containing said MT certificate and AP certificate for said two-way certificate authentication; 3) after AS receives said certificate authentication request message, AS authenticates the AP certificate and MT certificate in said message, and then sends back to AP the certificate authentication response message containing AS signature for said two-way certificate authentication; 4) after AP receives said certificate authentication response message, AP authenticates the AS signature, so as to obtain the result of authentication of the MT certificate. AP judges the result of authentication. If the authentication is not successful, AP sends back to MT said certificate authentication response message as the access authentication response message for said two-way certificate authentication; If the authentication is successful, AP begins to consult with MT the secret key for conversation while it sends back to MT said access authentication response message; and 5) after MT receives said certificate authentication response message, MT authenticates the AS signature and obtains the result of authentication of the AP certificate, so as to complete said two-way certificate identification between MT and AP, and then MT performs the corresponding processing to complete said negotiation of secret key for conversation.

According to its preferred embodiments, the present invention has provided a method for the secure access of mobile terminal to the Wireless Local Area Network (WLAN) and for secure data communication via wireless link, wherein 1) when MT logs on AP, each part informs the other of its own certificate, then they complete said negotiation of secret key for conversation, and, meanwhile, MT: also completes informing AP of the access authentication request identification; 2) AP sends to AS the certificate authentication request message containing the MT certificate and AP certificate for said two-way certificate authentication; 3) after AS receives said certificate authentication request message, AS authenticates the AP certificate and MT certificate in said message, and then sends back to AP the certificate authentication response message containing AS signature for said two-way certificate authentication; 4) after AP receives said certificate authentication response message, AP authenticates the AS signature, so as to obtain the result of authentication of the MT certificate, and then sends back to MT said certificate authentication response message as the access authentication response message for said two-way certificate authentication; and 5) after MT receives said access authentication response message, MT authenticates the AS signature, and then judges whether the AP certificate in the message is the same as the one AP informed of before negotiation of secret key for conversation. If it is not, the authentication fails; if it is, MT obtains the result of the authentication of the AP certificate from the message, so as to complete said two-way certificate authentication process between MT and AP.

Said access authentication request message also comprises access authentication request identification.

Said certificate authentication request message also comprises access authentication request identification, or also comprises access authentication request identification and AP signature.

Said certificate authentication response message also comprises, before the signature filed of AS, the information of the result of the MT certificate authentication and those of the AP certificate authentication.

Said access authentication response message is identical with said certificate authentication response message.

Said access authentication request identification is a string of random data or authentication serial number.

Said information of MT certificate authentication result comprises the MT certificate, and the MT certificate authentication result and the AS signature, or comprises the MT certificate and the MT certificate authentication result.

Said information of the AP certificate authentication result comprises the AP certificate, the AP certificate authentication result, the access authentication request identification and the AS signature, or comprises the AP certificate, the AP certificate authentication result and the access authentication request identification.

When MT wants to access to the designated AP, the MT must first of all obtain the relevant information of the AP or the certificate of the AP.

Said negotiation of secret key for conversation refers to MT or AP using AP's or MT's common key and their respective private key to generate the secret key for conversation.

In one of the preferred embodiments of the present invention, negotiation of secret key for conversation comprises the following:
1) MT secretly chooses an integer a, from which to calculate the integer f(a), combines the integer f(a) and the MT signature on it into the secret key negotiation request message, and transmits it to AP; said f is a function rendering integer a from the integer f(a) incalculable;
2) after it receives said secret key negotiation request message, AP secretly chooses an integer b, from which to calculate the integer f(b), forms the integer f(b) and the AP signature on it into the secret key negotiation response message, and transmits it to MT; said f is a function rendering integer b from the integer f(b) incalculable; and
3) AP calculates g(b,f(a)), and MT calculates g(a, f(b)) after it receives said secret key negotiation response message, as the secret key for conversation in the process of communication; said g is a function rendering the calculation of g(a, f(b))=g(b,f(a)) possible.

In another preferred embodiment of the present invention, said negotiation of secret key for conversation comprises the following:
1) AP secretly chooses an integer b, from which to calculate integer f(b), combines the integer f(b) and the AP signature on it into the secret key negotiation request message, and transmits it to MT; said f is a function rendering integer a from the integer f(b) incalculable;
2) after it receives said secret key negotiation request message, MT secretly chooses an integer a, from which to calculate the integer f(a), combines the integer f(a) and the MT signature on it into the secret key negotiation response message, and transmits it to AP; said f is a function rendering integer a from the integer f(a) incalculable; and
3) MT calculates g(a,f(a)), and AP calculates g(a, f(b)) after it receives said secret key response message, as the secret key for conversation in the process of communication; said g is a function rendering the calculation of g(a, f(b))=g(b,f(a)) possible.

In another preferred embodiment of the present invention, negotiation of secret key for conversation comprises the following:
1) MT or AP generates a string of random data, and transmits them as the secret key negotiation request message to AP or MT after encryption using the common key of AP or MT;
2) after it receives said secret key negotiation request message from MT or AP, AP or MT uses its own private key for decryption, obtains the random data generated by the other part; then AP or MP generates again a string of random data; and sends them as the secret key negotiation response message to MT or AP after encryption using the common key of MT or AP; and
3) After it receives said secret key negotiation response message from AP or MT, MT or AP, uses its own private key for decryption, obtains the random data generated by the other part; both MT and AP utilizes the random data generated by the other part and itself to generate the secret key for conversation.

In another preferred embodiment of the present invention, negotiation of secret key for conversation comprises the following:
1) MT or AP generates a string of random data, and, after it utilizes the common key of AP or MT for encryption, attaches its own signature as the secret key negotiation request message, and transmits it to AP or MT; and
2) after AP or MT receives said secret key negotiation request message from MT or AP, it utilizes the common key of MT or AP to authenticate the signature, and then utilizes its own private key to decrypt the encrypted message received; both MT and AP uses the random data as the secret key for conversation.

Besides, said negotiation of secret key for conversation may also comprise negotiation of the communication algorithm used in the process of communication.

The present invention has the following advantages over the prior art:

It has resolved the problem of failure in WLAN to have an effective control of secure MT access, and overcome the limitation on the confidentiality of the data communication via wireless link. Besides, it combines the common key encryption system and the symmetry encryption technology, has realized the two-way certificate authentication between MT and AP, and further improved the security of access; in addition, it has accomplished, through the dynamic negotiation of secret key for conversation, the dynamic revision of the secret key in the process of each authentication, secret key and communication, to achieve the secure data communication, and greatly increased the difficulty of decryption. In conclusion, the method has not only achieved control on the access of MT, but also ensured the security of MT access and the high confidentiality of communication.

DESCRIPTION OF THE PREFERRED EMBODIMENTS

Following is a further description of the present invention on the basis of the drawings and embodiments.

Figure 1:
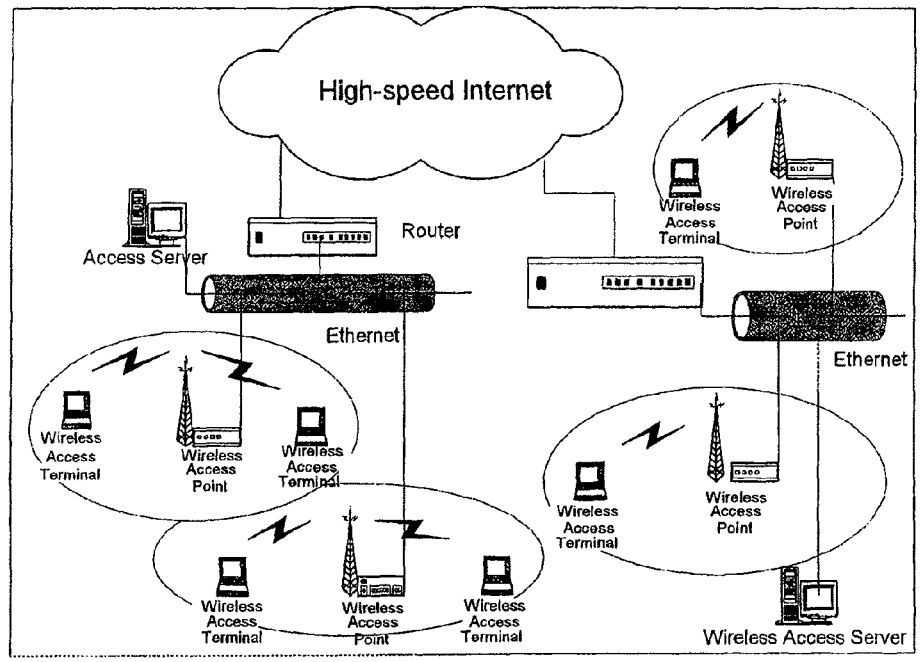
FIG. 1 is a diagram showing the structure of the conventional broadband wireless IP system.
Figure 2:
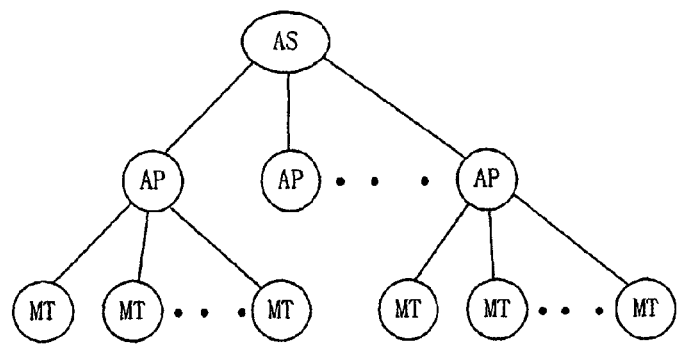
FIG. 2 is a block diagram showing the logic structure of the AS-based WLAN security authentication system of the present invention.
Figure 3:
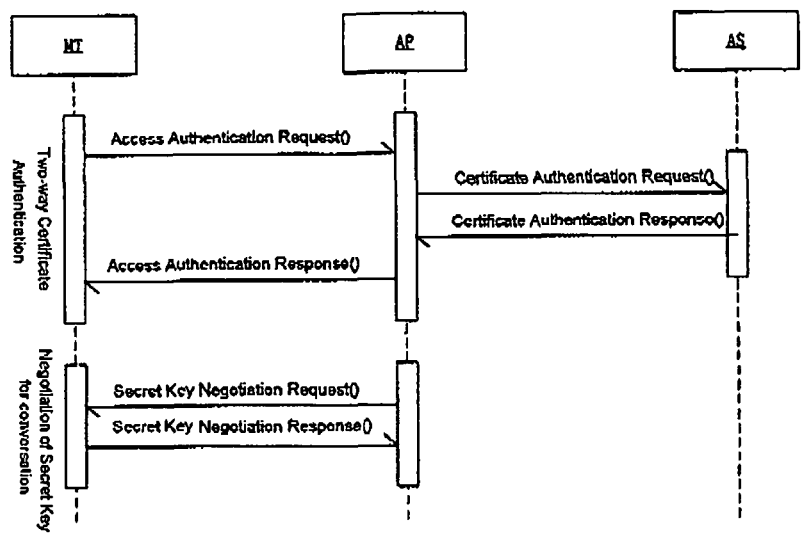
FIG. 3 is a flow chart of authentication of the present invention at the time of MT access.

FIG. 2 is a block diagram showing the logic structure of the AS (Authentication Server)-based WLAN security authentication system. The common key encryption technology is used. When MT logs on AP, two-way certificate authentication must be performed using AS. Only the MT holding the authorized certificate can access to AP holding the authorized certificate, otherwise, AP refuses MT to access or MT refuses to log on AP. After successful authentication, MT and AP carry on negotiation of common key for conversation, use the symmetry encryption technology to realize secure data communication via the wireless link. The whole process is as shown in FIG. 3, in which the contents of the certificate mainly comprise the serial number of the certificate, name of the certificate authorizer, term of validity of the certificate, name of the certificate holder, common key information of the certificate holder, signature algorithm used by the certificate authorizer and signature of the certificate authorizer on the certificate.

1. Two-way Certificate Authentication

When MT logs on AP, the two parts perform the two-way certificate authentication through AS as is shown in the following workflow:

a) Access authentication request. MT sends to AP the access authentication request message, that is, sending to AP the MT certificate and a string of random data or authentication serial number, in which the string of random data or authentication serial number are called access authentication request identification;

b) Certificate authentication request. After it receives the MT access authentication request message, AP sends to AS the certificate authentication request message, that is, sending to AS the MT certificate, access authentication request identification and AP certificate or MT certificate, access authentication request identification, and the certificate authentication request message constituted by the signature of AP's private key on them;

c) Certificate authentication response. After AS receives the AP's certificate authentication request message, if the message contains AP's signature, AS first authenticates the signature as to its authenticity. If it is not authentic, the authentication result are determined as failure. Then it authenticates the AP certificate and the MT certificate as to their legitimacy. With the authentication done, AS will send back to AP [1] the MT certificate authentication result information including the MT certificate and the MT certificate authentication result, and AS's signature on them, or only including the MT certificate and the MT certificate authentication result, [2] AP certificate authentication result information including the AP certificate and AP authentication result and access authentication request identification, and AS's signature on them or only including the AP certificate and the AP certificate authentication result, and the access authentication request identification, and [3] the certificate authentication responses message constituted by AS's signatures on [1] and [2];

d) Access authentication response. AP authenticates the signature on the certificate authentication response message sent back by AS, and obtains the MT certificate authentication result. AP sends back to MT the certificate authentication response message as the access authentication response message;

e) MT authenticates the signature on the authentication response message sent back by AP, and obtains the authentication result of the AP certificate.

Now, the two-way certificate authentication process has been completed between MT and AP. If their certificates are successfully authenticated, AP allows MT to access, or it refuses it to access, or MT refuses to log on AP. Now, the MT having the authorized certificate has successfully accessed to the AP having the authorized certificate, and AP's function to control the secure access of MT has been completed.

2. Negotiation of Secret Key for Conversation

After the two-way certificate authentication of MT and AP is successfully performed, that is, achieving MT's successful entry, the two parts then use each other's common key and their respective own private key to generate in itself the secret key for conversation to be used for encryption and decryption of the communication data messages, so as to realize the secure, confidential wireless communication between MT and AP. However, it is worth noting that within the term of validity of the certificate, the secret key for conversation between MT and AT remains unchanged. In order to realize each authentication of each secret key, the dynamic negotiation of the secret key for conversation is necessary. The dynamic negotiation of the secret key for conversations proceeds as follows:

a) The secret key negotiation request. MT or AP generates a string of random data, and, after encryption using the common key of AP and MT, sends to AP or MT the secret key negotiation request message;

b) The secret key negotiation response. After AP or MT receives the secret key negotiation request message sent from MT or AP, AP or MT uses its own private key for decryption, and obtains the random data generated by the other part. It then locally generates a string of random data, and, after encryption using the common key of MT or AP, responds to MT or AP in respect of the secret key negotiation response message;

c) After MT or AP receives the secret key negotiation response message sent from AP or MT, MT or AP uses its own private key for decryption, and obtains the other part's random data; MT and AP both use the two random data generated by itself or the other part to generate the secret key for conversation to be used for encryption and decryption of the communication data messages.

To further improve the confidentiality of the communication, after MT and AP carry on communication for a period of time or exchange given amount of messages, the negotiation of the secret key for conversation may be performed once again.

The two-way certificate authentication completes MT's secure access and the negotiation of the secret key for conversation fully ensures the highly confidential communication between MT and AP.

It is specially pointed out that:

(1) If MT intends to access to the designated AP, MT should, before the two-way certificate authentication, know about the relevant information of AP or keep the certificate of AP, in order for MT to judge the access authentication response message it receives;

(2) The negotiation of the secret key for conversation may also comprise negotiation of the communication algorithms, that is, in the secret key negotiation request message are listed the communication algorithms supported by the requesting part. The responding part chooses one of the communication algorithms provided by the requesting part, and sends back to the requesting part through the secret key negotiation response message. After the negotiation of the secret key for conversation is completed, the two parts use the communication algorithm of negotiation to perform confidential communication.

(3) The dynamic negotiation of the secret key for conversation may also be realized as follows. MT or AP locally generates a string of random data, attaches its own signature, and sends it to the other part after encryption using the other part's common key. After AP or MT receives it, AP or MT uses the other part's common key to authenticate whether it is the data sent by the other part, then uses its own private key to decrypt the encrypted message it receives. The two parts use the random data as secret key for conversation to decrypt the communication data.

(4) The negotiation of the secret key for conversation may also proceeds as follows:
a) MT secretly chooses an integer a, calculates f(a), sends to AP f(a) and MT's signature on it, in which f is a function rendering the calculation of a from f(a) impossible;
b) AP secretly chooses an integer b, calculates f(b), sends to MT f(b) and MT's signature on it, in which the definition of function f is the same as a);
c) MT calculates g(a, f(a)) and AP calculates g(b, f(a)), as the is secret key for conversation in the process of communication, in which g is a function rendering the calculation of g(a, f(b))=g(b, f(a)) possible.

(5) As above mentioned, first performing the two-way certificate authentication and then the negotiation of secret key for conversation, but in the specific implementation of the process, it might also be that the negotiation of secret key for conversation is performed before the two-way certificate authentication, or the two processes are performed in combination or alternatively.

(6) The negotiation of the secret key for conversation is first, and the two-way certificate authentication is then performed specifically as follows:
a) When MT logs on AP, the two parts inform each other of their respective certificate;
b) Using the said method, MT and AP perform the negotiation of the secret key for conversation;
c) Using the said Method, MT and AP perform the two-way certificate authentication, and judge whether the certificate used by the other part is the same as the certificate informed of by it in step a). If it is not, the authentication fails; or the authentication result depend on the result of the process of the two-way certificate authentication.

(7) The two-way certificate authentication and negotiation of the secret key for conversation are performed in alternation as follows:

The processes of two-way certificate authentication and negotiation of secret key for conversation are exactly the same as above. The difference lies only in the alternation of the sequence of the messages. That is, when MT logs on AP, MT sends to AP the access authentication request message. After it receives the message, AP, while sending AS the certificate authentication request message, begins the negotiation with MT of the secret key for conversation, so that the two-way certificate authentication and negotiation of the secret key for conversation are performed alternatively at a higher speed than the separate performance.

(8) The two-way certificate authentication and negotiation of the secret key for conversation are performed in combination as follows:

When MT logs on AP, the two parts first perform the two-way certificate authentication, and then the negotiation of the secret key for conversation. But when the authentication is about to be finished, that is, AP, while sending back to MT the access authentication response message, begins the negotiation with MT of the secret key for conversation, that is, it may add the secret key negotiation request information to the access authentication response message, so that the two-way certificate authentication and negotiation of the secret key for conversation are performed in combination at a higher speed than the separate performance.

(9) The two-way certificate authentication and negotiation of the secret key for conversation may also be performed in the following way. That is, the method is simplified by first performing the negotiation of secret key for conversation, and then the two-way certificate authentication. In the process in which MT and AP inform each other of their respective certificate and perform the negotiation of the secret key for conversation, MT should also inform AP of the access authentication request identification. Therefore, when performing the two-way certificate authentication after that, MT does not need to send to AP the access authentication request message. Instead, AP directly sends to AS the certificate authentication request message and begins the two-way certificate authentication. When the process of authentication is completed, it is only necessary for MT to judge whether the certificate used by AP is the same as the certificate AP informs before the negotiation of the secret key for conversation. If it is not, the authentication fails; if it is, the authentication result depends on the result of the process of the two-way certificate authentication.

The invention claimed is:

1. A method for the secure access of a mobile terminal to a Wireless Local Area Network (WLAN) and for secure data communication via wireless link, wherein when a Mobile Terminal (MT) logs on a wireless Access Point (AP), the Mobile Terminal (MT) and the Access Point (AP) execute a two-way certificate authentication wherein a Mobile Terminal (MT) certificate and an Access Point (AP) certificate are transmitted to an Authentication Server (AS) through the Access Point (AP) and are authenticated through the Authentication Server (AS), then the authentication result of the Mobile Terminal (MT) certificate and the Access Point (AP) certificate are returned from the Authentication Server (AS) to the Access Point (AP) and the Mobile Terminal (MT) so that the Access Point (AP) obtains the authentication result of the Mobile Terminal (MT) and the Mobile Terminal (MT) obtains the authentication result of the Access Point (AP); and the Mobile Terminal (MT) and the Access Point (AP) perform negotiation of secret key for conversation.

2. The method for the secure access of mobile terminal to the Wireless Local Area Network (WLAN) and for secure data communication via wireless link according to claim 1, wherein:
when MT logs on AP, MT and AP performs said two-way certificate authentication through AS;
after said two-way certificate authentication is successfully performed, MT and AP perform said negotiation of the secret key for conversation.

3. Said method for the secure access of mobile terminal to the Wireless Local Area Network (WLAN) and for secure data communication via wireless link according to claim 1, wherein:
when MT logs on AP, MT and AP inform one another of their respective certificate, and then they perform negotiation of secret key for conversation;
after said negotiation of secret key for conversation is completed, MT and AT performs the two-way certificate authentication through AS, and meanwhile judge whether the certificate used by the other part is the same as the one informed by it such that if it is not the same, the authentication fails; if it is the same, the result of the authentication depends on the result of said two-way certificate identification.

4. The method for the secure access of mobile terminal to the Wireless Local Area Network (WLAN) and for secure data communication via wireless link according to claim 1, wherein: said two-way certificate authentication comprising the steps:
1) when MT logs on AP, MT sends to AP the access authentication request message containing the MT certificate;
2) after AP receives said access authentication request message, it adds the AP certificate to the message, then sends to AS the certificate authentication request message containing said MT certificate and AP certificate;
3) after AS receives said certificate authentication request message, AS authenticates the AP certificate and MT certificate in said message, and then sends back to AP the certificate authentication response message containing the AS signature;
4) after AP receives said certificate authentication response message, AP authenticates the AS signature, so as to obtain the result of authentication of the MT certificate, and then sends back to MT the certificate authentication response message comprising information in the access authentication response message; and
5) after MT receives said access authentication response message, MT authenticates the AS signature and obtains the result of authentication of the AP certificate, so as to complete said two-way certificate identification between MT and AP.

5. The method for the secure access of mobile terminal to the Wireless Local Area Network (WLAN) and for secure data communication via wireless link according to claim 1, wherein:
1) when MT logs on AP, MT sends to AP the access authentication request message containing the MT certificate for said two-way certificate authentication;
2) after AP receives said access authentication request message, it adds the AP certificate to the message, then sends to AS the certificate authentication request message containing said MT certificate and AP certificate for said two-way certificate authentication, and meanwhile begins with MT negotiation of the secret key for conversation;
3) after AS receives said certificate authentication request message, AS authenticates the AP certificate and MT certificate in said message, and then sends back to AP the certificate authentication response message containing AS signature for said two-way certificate authentication;
4) after AP receives said certificate authentication response message, AP authenticates the AS signature, so as to obtain the result of authentication of the MT certificate, and then sends back to MT the certificate authentication response message as the access authentication response message for said two-way certificate authentication; and
5) after MT receives said access authentication response message, MT authenticates the AS signature and obtains the result of authentication of the AP certificate, so as to complete the process of said two-way certificate identification between MT and AP, and then MT performs the corresponding processing to complete said negotiation of secret key for conversation.

6. The method for the secure access of mobile terminal to the Wireless Local Area Network (WLAN) and for secure data communication via wireless link according to claim 1, wherein:
1) when MT logs on AP, MT sends AP the access authentication request message containing the MT certificate for said two-way certificate authentication;
2) after AP receives said access authentication request message, it adds the AP certificate to the message, then sends to AS the certificate authentication request message containing said MT certificate and AP certificate for said two-way certificate authentication;
3) after AS receives said certificate authentication request message, AS authenticates the AP certificate and MT certificate in said message, and then sends back to AP the certificate authentication response message containing AS signature for said two-way certificate authentication;
4) after AP receives said certificate authentication response message, AP authenticates the AS signature, so as to obtain the result of authentication of the MT certificate, AP judges the result of authentication. If the authentication is not successful, AP sends back to MT said certificate authentication response message as the access authentication response message for said two-way certificate authentication; If the authentication is successful, AP begins to consult with MT the secret key for to conversation while it sends back to MT said access authentication response message; and
5) after MT receives said certificate authentication response message, MT authenticates the AS signature and obtains the result of authentication of the AP certificate, so as to complete said two-way certificate identification between MT and AP, and then MT performs the corresponding processing to complete said process of negotiation of secret key for conversation.

7. The method for the secure access of mobile terminal to the Wireless Local Area Network (WLAN) and for secure data communication via wireless link according to claim 1, wherein:
1) when MT logs on AP, each part informs the other of its own certificate, then they complete said negotiation of secret key for conversation, and, meanwhile, MT also completes informing AP of the access authentication request identification;
2) AP sends to AS the certificate authentication request message containing the MT certificate and AP certificate for said two-way certificate Authentication;
3) after AS receives said certificate authentication request message, AS authenticates the AP certificate and MT certificate in said message, and then sends back to AP the certificate authentication response message containing AS signature for said two-way certificate authentication;
4) after AP receives said certificate authentication response message, AP authenticates the AS signature, so as to obtain the result of authentication of the MT certificate, and then sends back to MT said certificate authentication response message as the access authentication response message for said two-way certificate authentication; and
5) after MT receives said access authentication response message, MT authenticates the AS signature, and then judges whether the AP certificate is the same as the one AP informed of before negotiation of secret key for conversation such that if it is not the same, the authentication fails; if it is the same, MT obtains the result of the authentication of the AP certificate from the message, so as to complete said two-way certificate authentication process between MT and AP.

8. The method for the secure access of mobile terminal to the Wireless Local Area Network (WLAN) and for secure data communication via wireless link according to claim 1 wherein: said access authentication request message also comprising the access authentication request identification.

9. The method for the secure access of mobile terminal to the Wireless Local Area Network (WLAN) and for secure data communication via wireless link according to claim 1, wherein: said certificate authentication request message also comprising the access authentication request identification, or also comprising the access authentication request identification and AP signature.

10. The method for the secure access of mobile terminal to the Wireless Local Area Network (WLAN) and for secure data communication via wireless link according to claim 1, wherein: said certificate authentication response message also comprising, before the signature filed of AS, the information of the result of the MT certificate authentication and those of the AP certificate authentication.

11. The method for the secure access of mobile terminal to the Wireless Local Area Network (WLAN) and for secure data communication via wireless link according to claim 1, wherein: said access authentication response message is identical with said certificate authentication response message.

12. The method for the secure access of mobile terminal to the Wireless Local Area Network (WLAN) and for secure data communication via wireless link according to claim 1 wherein: said access authentication request identification is a string of random data or authentication serial number.

13. The method for the secure access of mobile terminal to the Wireless Local Area Network (WLAN) and for secure data communication via wireless link according to claim 1, wherein: said information of MT certificate authentication result comprising the MT certificate, and the MT certificate authentication result and the AS signature, or comprises the MT certificate and the MT certificate authentication result.

14. The method for the secure access of mobile terminal to the Wireless Local Area Network (WLAN) and for secure data communication via wireless link according to claim 1, wherein: said information of the AP certificate authentication result comprises the AP certificate, the AP certificate authentication result, the access authentication request identification and the AS signature, or comprises the AP certificate, the AP certificate authentication result and the access authentication request identification.

15. The method for the secure access of mobile terminal to the Wireless Local Area Network (WLAN) and for secure data communication via wireless link according to claim 1, wherein; when MT intends to access to the designated AP, the MT must first of all obtain the relevant information of the AP or the certificate of the AP.

16. The method for the secure access of mobile terminal to the Wireless Local Area Network (WLAN) and for secure data communication via wireless link according to claim 1, wherein: said negotiation of secret key for conversation refers to MT or AP using AP's or MT's common key and their respective own private key to generate the secret key for conversation.

17. The method for the secure access of mobile terminal to the Wireless Local Area Network (WLAN) and for secure data communication via wireless link according to claim 1, wherein: said negotiation of secret key for conversation comprising:
1) MT secretly chooses an integer a, from which to calculate the integer f(a), combines the integer f(a) and the MT signature on it into the secret key negotiation request message, and transmits it to AP; said f is a function rendering integer a from the integer f(a) incalculable;
2) after it receives said secret key negotiation request message, AP secretly chooses an integer b, from which to calculate the integer f(b), combines the integer f(b) and the AP signature on it into the secret key negotiation response message, and transmits it to MT; said f is a function rendering integer b from the integer f(b) incalculable; and
3) AP calculates g(b, f(a)), and MT calculates g(a, f(b)) after it receives said secret key negotiation response message, as the secret key for conversation in the process of communication; said g is a function rendering the calculation of g(a, f(b))=g(b, f(a)) possible.

18. The method for the secure access of mobile terminal to the Wireless Local Area Network (WLAN) and for secure data communication via wireless link according to claim 1, wherein: said negotiation of secret key for conversation comprising:
1) AP secretly chooses an integer b, from which to calculate integer f(b), combines the integer f(b) and the AP signature on it into the secret key negotiation request message, and transmits it to MT; said f is a function rendering integer a from the integer f(b) incalculable;
2) after it receives said secret key negotiation request message, MT secretly chooses an integer a, from which to lo calculate the integer f(a), forms the integer f(a) and the MT signature on it into the secret key negotiation response message, and transmits it to AP; said f is a function rendering integer a from the integer f(a) incalculable; and
3) MT calculates g(a, f(a)), and AP calculates g(a, f(b)) after it receives said secret key response message, as the secret key for conversation in the process of communication; said g is a function rendering the calculation of g(a, f(b))=g(b, f(a)) possible.

19. The method for the secure access of mobile terminal to the Wireless Local Area Network (WLAN) and for secure data communication via wireless link according to claim 1, wherein: said negotiation of secret key for conversation comprising:
1) MT or AP generates a string of random data, and sends them to AP or MT as the secret key negotiation request message after encryption using the common key of AP or MT;
2) After it receives said secret key negotiation request message from MT or AP, AP or MT uses its own private key for decryption, obtains the random data generated by the other part; then AP or MP generates again a string of random data; and sends them to MT or AP as the secret key negotiation response message after encryption using the common key of MT or AP; and
3) After it receives said secret key negotiation response message from AP or MT, MT or AP, uses its own private key for decryption, obtains the random data generated by the other part; both MT and AP utilizes the random data generated by the other part and itself to generate the secret key for conversation.

20. The method for the secure access of mobile terminal to the Wireless Local Area Network (WLAN) and for secure data communication via wireless link according to claim 1, wherein: said negotiation of secret key for conversation comprising:
1) MT or AP generates a string of random data, and, after it utilizes the common key of AP or MT for encryption, attaches its own signature as the secret key negotiation request message, and transmits it to AP or MT; and
2) after AP or MT receives said secret key negotiation request message from MT or AP, it utilizes the common key of MT or AP to authenticate the signature, and then utilizes its own private key to decrypt the encrypted message received; both MT and AP uses the random data as the secret key for conversation.

21. The method for the secure access of mobile terminal to the Wireless Local Area Network (WLAN) and for secure data communication via wireless link according to claim 1, wherein: said negotiation of secret key for conversation also comprising negotiation of the communication algorithm used in the process of communication.

22. A method for the secure access of mobile terminal to the Wireless Local Area Network (WLAN) and for secure data communication via wireless link, wherein when a Mobile Terminal (MT) logs on a wireless Access Point (AP), the Mobile Terminal (MT) and the Access Point (AP) execute a two-way certificate authentication wherein a Mobile Terminal (MT) certificate and an Access Point (AP) certificate are transmitted to an Authentication Server (AS) through the Access Point (AP) and are authenticated through the Authentication Server (AS), then the authentication results of the Mobile Terminal (MT) certificate and the Access Point (AP) certificate are returned from the Authentication Server (AS) to the Access Point (AP) and the Mobile Terminal (MT) so that the Access Point (AP) obtains the authentication result of the Mobile Terminal (MT) and the Mobile Terminal (MT) obtains the authentication result of the Access Point (AP).

\* \* \* \* \*

UNITED STATES PATENT AND TRADEMARK OFFICE
CERTIFICATE OF CORRECTION

PATENT NO. : 8,726,022 B2  
APPLICATION NO. : 10/534067  
DATED : May 13, 2014  
INVENTOR(S) : Tie et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2088 days.

Signed and Sealed this

Twenty-ninth Day of September, 2015

Michelle K. Lee
*Director of the United States Patent and Trademark Office*